United States Patent
Mualla

(10) Patent No.: US 12,553,198 B2
(45) Date of Patent: Feb. 17, 2026

(54) DAMPER AND DAMPER SYSTEM FOR DAMPING RELATIVE LATERAL MOVEMENT BETWEEN A TENSIONED CABLE AND A SUPPORT STRUCTURE

(71) Applicant: Damptech A/S, Lyngby (DK)

(72) Inventor: Imad H. Mualla, Copenhagen NV (DK)

(73) Assignee: Damptech A/S, Lyngby (DK)

( * ) Notice: Subject to any disclaimer, the term of this patent is extended or adjusted under 35 U.S.C. 154(b) by 628 days.

(21) Appl. No.: 18/000,701

(22) PCT Filed: May 26, 2021

(86) PCT No.: PCT/DK2021/050162
§ 371 (c)(1),
(2) Date: Dec. 5, 2022

(87) PCT Pub. No.: WO2021/244716
PCT Pub. Date: Dec. 9, 2021

(65) Prior Publication Data
US 2023/0212831 A1 Jul. 6, 2023

(30) Foreign Application Priority Data
Jun. 5, 2020 (DK) .................... PA 202070357

(51) Int. Cl.
*E01D 19/16* (2006.01)
*E04B 1/98* (2006.01)
(Continued)

(52) U.S. Cl.
CPC ............... *E01D 19/16* (2013.01); *E04B 1/98* (2013.01); *F16F 7/04* (2013.01); *F16F 15/022* (2013.01)

(58) Field of Classification Search
CPC .... E01D 19/16; E04B 1/98; F16F 7/04; F16F 15/022
(Continued)

(56) References Cited

U.S. PATENT DOCUMENTS 4,480,731 A 11/1984 Izeki et al.
7,124,460 B2 * 10/2006 Lecinq .................... E01D 19/14
14/21
(Continued)

FOREIGN PATENT DOCUMENTS

CN 102936874 A 2/2013
CN 105178184 A 12/2015
(Continued)

OTHER PUBLICATIONS

International Search Report, Nordic Patent Institute, Application No. PCT/DK2021/050162, mailed Jul. 12, 2021, 3 pages.
(Continued)

*Primary Examiner* — Raymond W Addie
(74) *Attorney, Agent, or Firm* — Nordic Patent Service

(57) ABSTRACT

A passive damper for damping relative lateral movement between a tensioned cable or other oblong member and a support structure includes a first fixture element rigidly connected to the cable or other oblong member, a second fixture element rigidly connected to the support structure, and at least one rotational damping device arranged between the first and second fixture elements. The rotational damping device is configured to translate the relative lateral movement into relative rotational moment between at least two arms of the rotational damping device that are connected at a rotational joint with a damping pad clamped in between the at least two arms. The rotational joint has a rotational axis substantially parallel with a longitudinal axis (X) of the cable.

20 Claims, 3 Drawing Sheets

(51) Int. Cl.
  *F16F 7/04* (2006.01)
  *F16F 15/02* (2006.01)
(58) Field of Classification Search
  USPC .......................................................... 14/21, 22
  See application file for complete search history.

(56) References Cited

U.S. PATENT DOCUMENTS

| | | |
|---|---|---|
| 8,307,585 B2 | 11/2012 | Mualla |
| 10,612,620 B2 | 4/2020 | Manzoor |
| 2003/0015922 A1 | 1/2003 | Corey |
| 2011/0101580 A1* | 5/2011 | Mualla ...................... F16F 7/04 |
| | | 267/140.11 |
| 2012/0247036 A1* | 10/2012 | Bournand ............... F16F 7/082 |
| | | 52/167.1 |
| 2014/0014808 A1 | 1/2014 | Kaal et al. |

FOREIGN PATENT DOCUMENTS

| | | | |
|---|---|---|---|
| CN | 109371814 A | 2/2019 | |
| EP | 1035350 A1 * | 9/2000 | ............ F16F 15/022 |
| JP | 2000045559 A | 2/2000 | |
| JP | 2001131913 A | 5/2001 | |
| RU | 100160 U1 * | 12/2010 | |
| WO | WO-2005121571 A1 * | 12/2005 | ............ F16F 1/3814 |

OTHER PUBLICATIONS

Taiwan Patent Office,, Search Report of Taiwan Patent Application No. 110120469, Date of Completion Apr. 22, 2024, 1 Page.

* cited by examiner

DAMPER AND DAMPER SYSTEM FOR DAMPING RELATIVE LATERAL MOVEMENT BETWEEN A TENSIONED CABLE AND A SUPPORT STRUCTURE

TECHNICAL FIELD

The disclosure relates to the field of construction and structures, in particular, to constructions and structures that use tensioned cables and more particularly to a cable damper for protecting a structure or construction supported by a cable, such as e.g. a cable-stay bridge, a suspension bridge or guided construction, from vibrations against dynamic stress such as the stress caused by an earthquake, the shock of a large sea wave, or stress that is produced by vibration and the like caused by shocks from transportation, machines, vehicles, wind, or the like.

BACKGROUND

When a structure or structural system, such a is excited, elements of the structure may get displaced relative to one another. If such displacements are large, or if they occur periodically, they may have a serious impact on the conditions of the structure and may cause severe damages or even result in a collapse.

Dampers play an important role in the protection of structures such as buildings, and they exist in numerous variants. Dampers are typically damping the motion by means of a friction force between two parts attached to the frame structure of the building, or by means of a fluid being pressed to flow between two chambers through a restriction. Other similar well-known methods of damping motion or vibrations exist. Some dampers are actively changing the damping effect corresponding to external conditions, and other dampers are passive dampers having a constant damping characteristic. The active dampers are expensive and technically complicated devices, which need extensive maintenance in order to work when needed. Further, they are prone to malfunctions, e.g. leaking of hydraulic fluids or breakdown of electronic control systems.

EP1035350 discloses a passive linear friction damper for damping lateral oscillations and vibrations of tensioned cables by linear sliding friction of a single first friction element connected to the cable and resiliently clamped between two friction elements that are connected to a support structure or to the anchorage device of the cable, to allow for axial displacements of the cable.

Linear friction dampers offer certain advantages such as high energy-dissipation capacity and stable cyclic behavior.

However, linear dampers suffer from several drawbacks, including:

The variation in their behavior due to corrosion on the steel plates (frictional interfaces), i.e. the skilled person cannot predict the friction coefficient, and hence the device cannot provide reliable friction/damping.

Dimensional limitations for projects that require high deformation capacities. Most national codes limit the length of slotted holes since the steel plate can be weakened. This limits the allowed displacement of linear friction dampers, and there is a risk that the damper will "lock" if the damper bolts hit the end of the slotted holes during an earthquake.

Abrasion of friction surfaces after a limited number of loading cycles with subsequent capacity degradation. The damper is not reliable over a project's lifetime, Stick-slip phenomena. Sticking occurs when the device does not slip at the predicted design force and a higher force is needed to activate the friction. A linear friction damper is susceptible to sticking.

insufficient out-of-plane stability of brace members in some installations. The more a linear connection is elongated, the less stable it is to out-of-plane forces, and therefore has a higher risk of device failure.

US2011/0101580 discloses a bearing comprising a block of flexible material, having two end surfaces; a first fixture element and a second fixture element connected at each of the end surfaces; wherein at least one rotational damping device is arranged between the first and second fixture elements, the bearing thus providing high dampening between structural parts of a structure.

SUMMARY

It is an object to provide a damper that overcomes or at least reduces the problem above.

The foregoing and other objects are achieved by the features of the independent claims. Further implementation forms are apparent from the dependent claims, the description, and the figures.

According to a first aspect, there is provided a passive damper for damping relative lateral movement between a cable or other oblong member and a support structure, the passive damper comprising; a first fixture element configured to be rigidly configured to be connected to the cable or other oblong member, and a second fixture element configured to be rigidly configured to be connected to the support structure, at least one rotational damping device is arranged between the first and second fixture elements, the rotational damping device is configured to translate the relative lateral movement into relative rotational moment between at least two arms of the rotational damping device that are connected at a rotational joint, the rotational joint having when in use a rotational axis substantially parallel with a longitudinal axis of the cable or other oblong member, wherein the first fixture element comprises a first opening for allowing the cable to extend through the first opening, and wherein the second fixture element comprises a second opening for allowing the cable to extend through the second opening.

By providing a passive damper with first and second fixture elements to be connected to the cable and the support structure respectively, and by providing a damping device that translates the relative lateral movement between the support structure and the cable into a relative rotational movement between the arms of a rotation friction damper, it becomes possible to provide a simple and effective damper for damping lateral movements of a cable using a rotation friction damper that has advantageous characteristics (compared to a linear friction damper), that requires little maintenance and provides reliable damping characteristics, also over time.

A rotation friction damper is less susceptible to sticking because rotation friction has the advantage of variable angular displacement and velocity. Rotation friction dampers have all inherent merits of the linear frictional dampers but avoid their disadvantages.

According to a possible implementation form of the first aspect, when the damper is in use, a circumferential gap is arranged between the cable and the second opening. Thus, the cable has space to laterally move inside the second opening, thereby allowing the cable to move laterally relative to the support structure.

In a possible implementation form of the first aspect, when the damper is in use, the first opening is associated with a sleeve that is clamped around the cable and the sleeve is rigidly connected to the first fixture element to ensure that the lateral movements of the cable result in corresponding lateral movements of the first fixture element.

According to a possible implementation form of the first aspect, when the damper is in use, the first fixture element is configured to move in unison with the cable.

According to a possible implementation form of the first aspect, the first fixture element and/or the second fixture element is a plate-like element.

According to a possible implementation form of the first aspect, the rotational damping device comprises a first arm having oppositely arranged first and second ends; and a second arm having oppositely arranged first and second ends, the first arm is rotationally connected to the first fixture element at its first end, and rotationally connected to a first end of the second arm at its second end by the rotational joint; and the second arm further being rotationally connected to the second fixture element at a second end of the second arm.

According to a possible implementation form of the first aspect, the passive damper comprises a set of two rotational damping devices oppositely arranged with respect to a perimeter of the first fixture element.

According to a possible implementation form of the first aspect, two sets of two rotational damping devices, oppositely arranged with respect to a perimeter of the first fixture element.

According to a possible implementation form of the first aspect, the damping material forms a friction element arranged between the first and second arms.

According to a possible implementation form of the first aspect, the damping material forms a visco-elastic element arranged between the first and second arms.

According to a possible implementation form of the first aspect, the damping material is a damping pad.

According to a possible implementation form of the first aspect, a first arm comprises two or more elongate elements arranged in parallel and/or wherein a second arm comprises two or more elongate elements arranged in parallel.

According to a possible implementation form of the first aspect, the rotational joint has a rotational axis parallel with a longitudinal axis of the cable or other oblong member and/or parallel with an axis through the first and/or second opening.

According to a possible implementation form of the first aspect, the first opening and the second opening are aligned.

According to a possible implementation form of the first aspect, the first fixture element surrounds the cable or other elongated member.

According to a possible implementation form of the first aspect, the second fixture element surrounds the cable or other elongated member.

According to a possible implementation form of the first aspect, two or more rotational damping devices, the two or more rotational damping devices preferably being symmetrically arranged around the perimeter of first and second openings.

According to a possible implementation form of the first aspect, the passive damper surrounds the cable.

According to a possible implementation of the first aspect, the cable passes through the passive damper.

According to a possible implementation form of the first aspect, a single cable passes through the passive damper.

According to a possible implementation form of the first aspect, the rotational damping device is a rotation friction damper.

According to a possible implementation form of the first aspect, a damping material is clamped in between the at least two arms.

According to a second aspect, there is provided a damper system for damping oscillations and vibrations of a tensioned cable that is connected to a support structure, comprising a passive damper according to the first aspect and any one possible implementation thereof.

According to a possible implementation form of the second aspect, a single cable passes through a single passive damper.

BRIEF DESCRIPTION OF THE DRAWINGS

In the following detailed portion of the present disclosure, the aspects, embodiments, and implementations will be explained in more detail with reference to the example embodiments shown in the drawings, in which.

DETAILED DESCRIPTION

Figure 1:
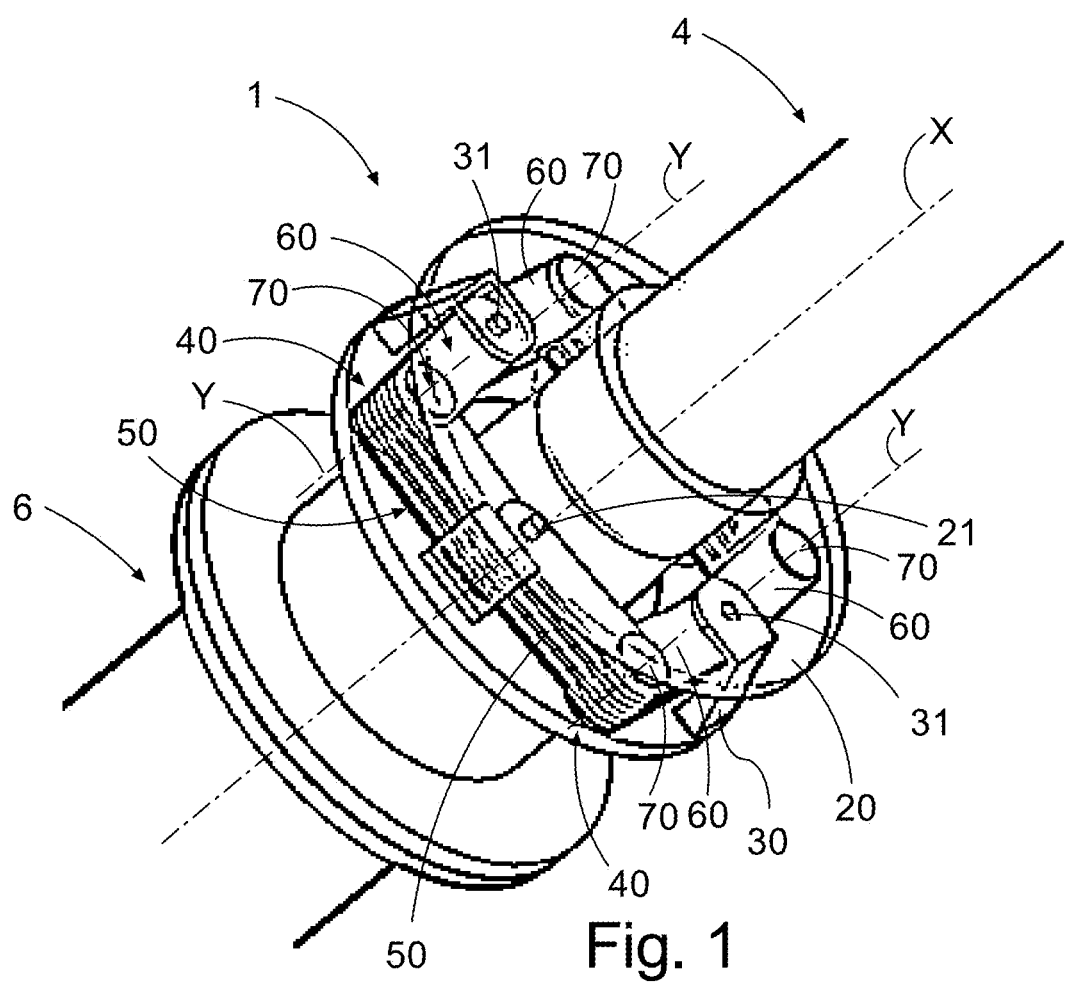
FIG. 1 is an elevated partially transparent view of a passive damper according to an embodiment installed on a cable and support structure, FIG. 2 and elevated view of a passive damper according to an embodiment.
Figure 2:
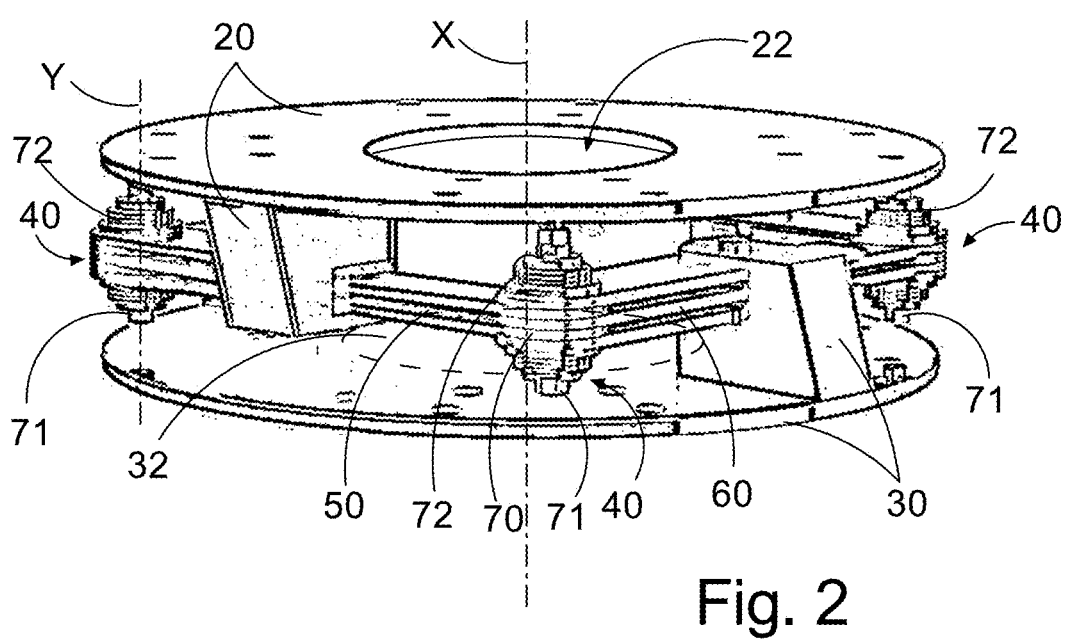
Figure 3:
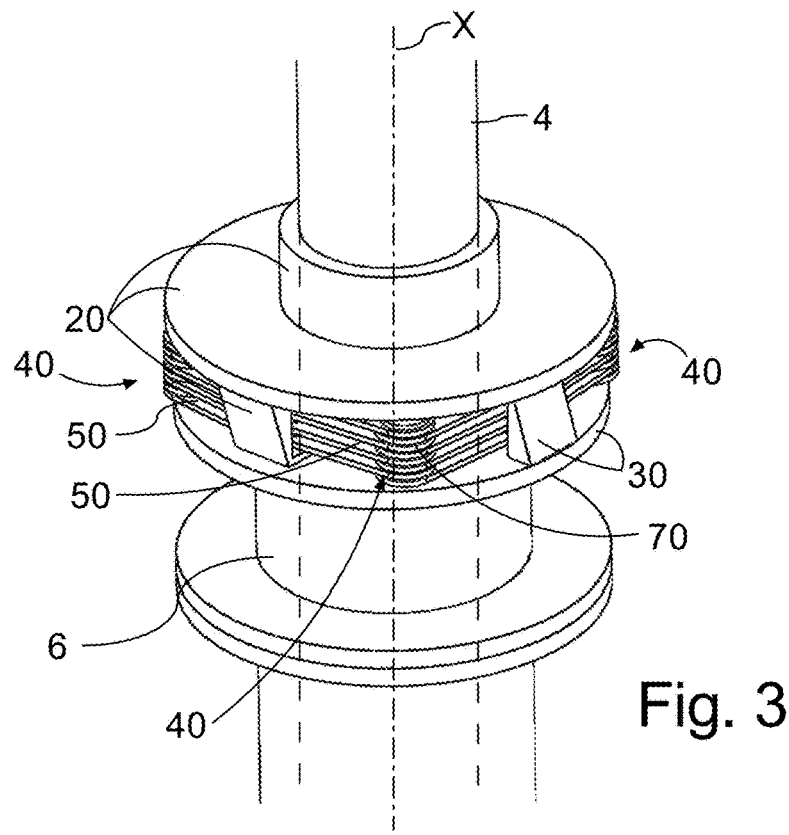
FIG. 3 is another elevated view of the passive damper of the embodiment illustrated in FIG. 1 installed on a cable and support structure.
Figure 4:
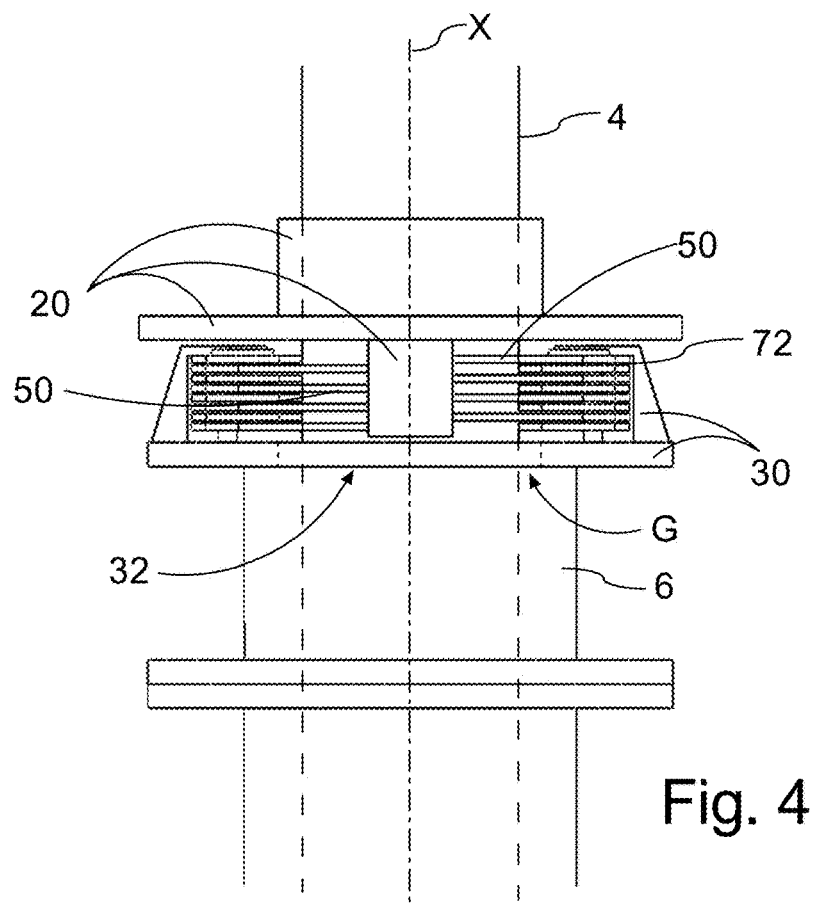
FIG. 4 is a side view of the passive damper of the embodiment illustrated in FIG. 1 installed on the cable and support structure.

A passive damper for damping lateral movements of a tensioned cable 4, or other oblong member, relative to the support structure 6 is described with reference to FIGS. 1 to 5.

The tensioned cable 4, which can be composed of a multitude of individual, bundled cable strands, is concentrically surrounded by a support structure 6, that may act as an anchorage device of the cable 4. A passive damper 1 is installed between the cable 4 and the support structure 6. The tensioned cable 4 has a longitudinal axis X.

The passive damper 1 comprises a first fixture element 20 that is configured for being rigidly connected to the cable 4, and a second fixture element 30 rigidly connected to the support structure 6. The support structure 6 is shown as a tubular instruction, but it is understood that the cross-sectional shape of the support structure 6 does not need to be round, but could have any other suitable cross-sectional outline, e.g. square, pentagonal, hexagonal or octagonal.

The first fixture element 20 and the second fixture element 20 can be plates, for example, steel plates. The first and second fixtures may have a circular outer periphery as shown in the drawings, or the outer periphery may be squared, or have another shape, e.g. pentagonal, hexagonal or octagonal, and in an embodiment matching the cross-sectional outline of the support structure 6.

The second fixture element 30 may be provided with means for securing the second fixture element 30 to e.g. the support structure 6. The securing means may be holes/ apertures in the second fixture element 30, through the second fixture element can be bolted to the support structure 6.

The first fixture element 20 is in an embodiment provided with a sleeve that is either an integral part of the first fixture element or welded to the fixture element 20 and the sleeve is clamped onto the cable 4 in order to ensure that the first fixture element 20 is rigidly secured to the cable and to ensure that the first fixture element 20 moves in unison with the cable 4.

The first fixture element 20 is provided with a first opening 22 through which the cable 4 extends. The first 22 opening may in an embodiment have a quite close or tight fit around the cable 4. The optional sleeve mentioned above is in principle an extension of the first opening 22.

The second fixture element 30 is provided with a second opening 32 through which the cable 4 extends with a gap G between the cable 4 and the second opening 32, to allow the table to move freely laterally relative to the second fixture element 30, except for the damping forces created by the damping devices 40.

The passive damper 1 comprises at least one rotational damping device rotational friction damper) 40 arranged between the first- and second fixture elements 20, 30. In the embodiment of FIGS. 1 to 5 the passive damper is 1 shown to have four rotational damping devices 40 arranged in two pairs of two opposite to each other with respect to a perimeter of e.g. the first fixture element 20. However, in other embodiments (not shown) there are 1, 2, 3, 4, 5, 6, 7, 8, 9, 10, . . . , 16, or more rotational dampers 40 arranged around the perimeter of the passive damper 1. Advantageously the rotational friction dampers 40 are arranged in opposite pairs of rotational friction dampers 40 viewed along the perimeter of the first- and second fixture elements 20, 30.

Each rotational friction damper 40 comprises a first arm 50 having oppositely arranged first and second ends, and a second arm 60 also having oppositely arranged first and second ends. The first arm 50 is rotationally connected to the first fixture element 20 by its first end 51. Hereto, the first fixture element 20 comprises an attachment block for each rotation damper 40. These attachment blocks are rigidly connected, for example, welded, to the second fixture element 30. The first arm 50 is, at its opposite second end 52, rotationally connected to a first end 61 of the second arm 60. The second arm 60 is, at its opposite second end 62, rotationally connected to the second fixture element 30. Hereto, this second fixture element 30 comprises an attachment block for each rotational damper 40. These attachment blocks are rigidly connected, for example, welded, to the second fixture element 30.

Each rotational friction damper 40 thus comprises two arms 50, 60 connected to each other via a rotational joint 70, and is arranged in a V-shape, i.e. with an angle between the arms. The rotational joint 70 allows rotation about a rotation axis Y.

The rotational joint 70 may further comprise a friction material element, or pad 72, between the plates that form the arms, to increase the friction between the arms 50, 60 of the rotational dampers 40.

An arm 50, 60, can be formed by a single elongate element, e.g. a steel plate. However, each arm may comprise two or more elongate elements. The number of elongate elements may vary according to the dimensions of the passive damper 1, in accordance with its intended use. In general, the number n, m of elements constituting the respective arms 50, 60 should be equal (n=m) or n=m+1 or m=n+1 if odd.

When the arms 50, 60 comprise a plurality of elongate elements, a pad 72, e.g. piece of friction material may be arranged between each of the alternating elongate elements of the arms 50, 60, at the joint 70.

Alternatively, or additionally, a visco-elastic element or pad 72 may be arranged between one or more of the alternating elongate elements of the first and second arms 50, 60 to increase the resistance to movement (damping) between the arms 50, 60 of the rotational dampers. The visco-elastic element is fixed to both of a set of adjacent elongate elements of the respective arms 50, 60 of the rotational damper 40, or in the case where each arm comprises a plurality of elongate elements, between each adjoining elongate elements of the two arms 50, 60.

The joint 70 further comprises a pin or bolt 71 and clamping means 72 for pressing the elongate elements together at the joint 70 and to increase the damping. Such clamping means may e.g. be provided by one or more springs, such as disc springs. A nut (not shown) connected to an end of the pin/bolt 71 may complete the rotational joint 70.

By this arrangement of the rotational dampers 40 around the perimeter of the fixture elements 20, 30, large lateral displacements and large rotations can be achieved by proper dimensioning of the size (length) of the lever arms 50, 60, and the angle between the arms. Experiments have shown that the angle between the arms 50, 60 should be between 60 to 90°. Rotation dampers having short arms 50, 60 may be used for dampening vibration or oscillation of small amplitude, in the form of displacement between the fixture element 20, 30. Rotation dampers having longer arms 50, 60 may be used for dampening vibration or oscillation of larger amplitude.

The rotation dampers 40 may be designed in different arrangements and geometries. By proper dimensioning of the block 10 and the first- and second fixture elements 20, 30 the rotational dampers 40 may be concealed within the volume defined by the fixture elements 20, 30, or they may as in the shown embodiment extend partly from the side (perimeter) of the passive damper 1.

The elongate elements of the arms 50, 60 may be formed in steel, aluminum, metal, plastic, or a composite material.

Each of the rotational dampers is connected to the respective fixture elements by a pin 21, 31. Each of the arms 50, 60 of a rotational damper 40 are fixed via the pins 21, 31 to a different one of the attachment blocks that are connected to the two steel plates (fixture elements 20, 30), i.e. one to the first (top) fixture element 20 and one to the second (bottom) fixture element 30, as shown in the drawing. These pins 21, 31 provide free rotation for the arms 50, 60 of the rotational damper 40. The first arm 50 is connected to pin 21. Via the joint 70, the first arm 50 is connected to the second arm 60 of a rotational damping device 40.

Thus, it may be appreciated, that the first arm 60, in this embodiment shares the rotational joint (pin 21) with a second arm 60 of the next damper 40. However, in other embodiments, each or some of the rotational dampers may have individual pins to join them with their respective fixture elements.

In an embodiment, (not shown) a restoring element, such as a spring, may be formed on the pins 21, 31, and extending to and being fixed to the first- and second fixture elements 30, 20 opposite to the pin 21, 31, respectively. Thereby, the relative displacement of the first- and second fixture elements 20, 30 cannot be restored to its original position by the. Alternatively, the spring may be arranged directly between the first- and second fixture elements 20, 30.

Figure 5:
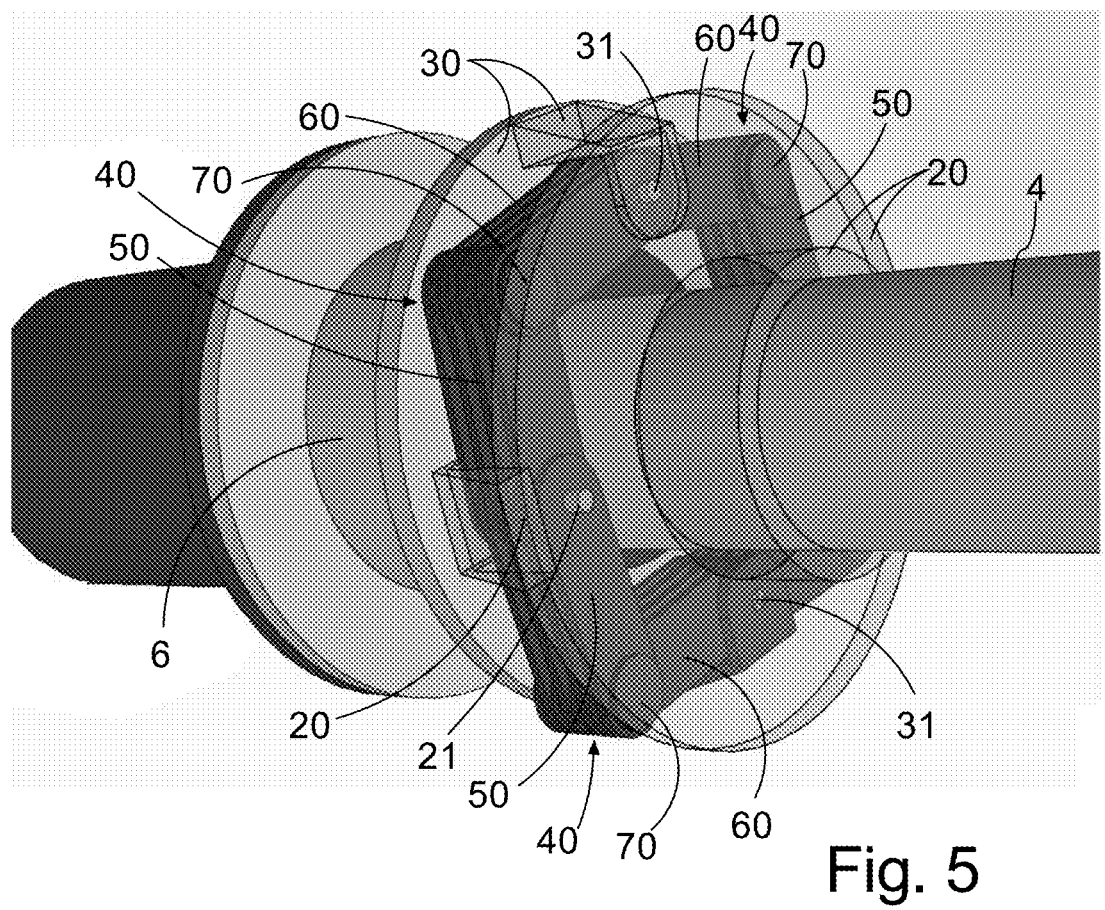
FIG. 5 is an elevated partially transparent view of a passive damper according to the embodiment illustrated in FIG. 1 installed on a cable and support structure, with the cable laterally displaced relative to the support structure.

The damping device works as follows. In its rest position, i.e. in the absence of any cable vibration or oscillation, the cable 4 will be in a defined position within the support structure 6, typically substantially concentric with the support structure 6 and with the cable substantially concentric in the second opening 32. When a vibration stresses the cable 4 in a lateral direction (lateral as relative to the longitudinal axis X of the cable 4) and when the frictional resistance of the four rotational friction dampers 40 is reached and overcome, the cable 4 will start a lateral displacement against the force of the above-described friction rotation dampers 40. Such lateral displacement in one direction of the cable 4 relative to the support structure 6 is shown in FIG. 5.

The movement of the cable 4, hindered by the rotational friction dampers 40, continues until the maximal lateral displacement is reached. During this period of time, the speed of the lateral movement of the cable 4 has been slowed down by the rotational friction dampers 40 to a most appreciable extent, and the vibration or oscillation of the cable 4 is effectively damped.

The rotational dampers 40 will provide the same action when the cable 4 is displaced in any other lateral direction since the rotational friction dampers 40 allow a lateral movement of the cable 4 in any direction that is perpendicular to the longitudinal axis X of the cable 4.

The passive damper and damper system are suitable for damping oscillations and vibrations of cable-stayed bridges, suspension bridges, and any other cable supported or guided constructions. The passive damper effectively damps cable movements in any direction transversely/laterally to its longitudinal axis without play.

The invention claimed is:

1. A passive damper for damping relative lateral movement between a cable and a support structure, said passive damper comprising:
    a first fixture element configured to be rigidly connected to said cable, and
    a second fixture element configured to be rigidly connected to said support structure,
    at least one rotational damping device is-arranged between the first and second fixture elements,
    said at least one rotational damping device being configured to translate said relative lateral movement into relative rotational moment between at least two arms of said at least one rotational damping device that are connected at a rotational joint, said rotational joint having when in use, a rotational axis Y substantially parallel with a longitudinal axis X of said cable,
    wherein said first fixture element comprises a first opening for allowing said cable to extend through said first opening, and wherein said second fixture element comprises a second opening for allowing said cable to extend through said second opening.

2. The passive damper according to claim 1, having when in use, a circumferential gap G between said cable and said second opening.

3. The passive damper according to claim 1, wherein said first fixture element, when in use, is configured to move in unison with said cable.

4. The passive damper according to claim 1, wherein said first fixture element and/or said second fixture element is a plate-like element.

5. The passive damper according to claim 1, wherein the at least one rotational damping device comprises
    a first arm having oppositely arranged first and second ends; and
    a second arm having oppositely arranged first and second ends,
said first arm being rotationally connected to the first fixture element at its first end, and rotationally connected to a first end of said second arm at its second end by said rotational joint;
and said second arm further being rotationally connected to said second fixture element at a second end of said second arm.

6. The passive damper according to claim 1, comprising a set of two rotational damping devices oppositely arranged with respect to a perimeter of the first fixture element.

7. The passive damper according to claim 1, comprising two sets of two rotational damping devices, oppositely arranged with respect to a perimeter of the first fixture element.

8. The passive damper according to claim 1, wherein said damping material forms a friction element arranged between the first and second arms.

9. The passive damper according to claim 1, wherein said damping material forms a visco-elastic element between the first and second arms.

10. The passive damper according to claim 1, wherein a first arm comprises two or more elongate elements arranged in parallel and/or wherein a second arm comprises two or more elongate elements arranged in parallel.

11. The passive damper according to claim 1, wherein damping material is clamped in between said at least two arms.

12. The passive damper according to claim 1, wherein the cable passes through the passive damper.

13. The passive damper according to claim 1, wherein the passive damper comprises a set of two rotational damping devices oppositely arranged with respect to a perimeter of the first fixture element.

14. The passive damper according to claim 1, wherein two sets of two rotational damping devices are oppositely arranged with respect to a perimeter of the first fixture element.

15. The passive damper according to claim 1, wherein the rotational joint has a rotational axis parallel with a longitudinal axis of the cable and/or parallel with an axis through the first and/or second opening.

16. The passive damper according to claim 1, wherein the first fixture element surrounds the cable.

17. The passive damper according to claim 1, wherein the second fixture element surrounds the cable.

18. The passive damper according to claim 1, comprising two or more rotational damping devices, the two or more rotational damping devices being symmetrically arranged around the perimeter of first and second openings.

19. The passive damper according to claim 1, wherein the passive damper surrounds the cable.

20. A damper system for damping oscillations and vibrations of a cable that is connected to a support structure, comprising a passive damper for damping relative lateral movement between a cable and a support structure, said passive damper comprising;
    a first fixture element configured to be rigidly connected to said cable, and
    a second fixture element configured to be rigidly connected to said support structure, at least one rotational damping device is arranged between the first and second fixture elements, said rotational damping device being configured to translate said relative lateral movement into relative rotational moment between at least two arms of said rotational damping device that are connected at a rotational joint, said rotational joint having when in use, a rotational axis Y substantially parallel with a longitudinal axis X of said cable, wherein said first fixture element comprises a first opening for allowing said cable to extend through said first opening, and wherein said second fixture element comprises a second opening for allowing said cable to extend through said second opening.

* * * * *